US005752242A

United States Patent [19]

Havens

[11] Patent Number: 5,752,242
[45] Date of Patent: May 12, 1998

[54] SYSTEM AND METHOD FOR AUTOMATED RETRIEVAL OF INFORMATION

[75] Inventor: Charnell T. Havens, McKinney, Tex.

[73] Assignee: Electronic Data Systems Corporation, Plano, Tex.

[21] Appl. No.: 634,640

[22] Filed: Apr. 18, 1996

[51] Int. Cl.$^6$ ........................................... G06F 17/30
[52] U.S. Cl. ............................. 707/3; 707/2; 707/10
[58] Field of Search ........................... 395/60, 61, 62; 707/3, 2, 10

[56] References Cited

U.S. PATENT DOCUMENTS

| | | | |
|---|---|---|---|
| 5,101,345 | 3/1992 | MacPhail | 395/601 |
| 5,162,992 | 11/1992 | Williams | 395/602 |
| 5,222,234 | 6/1993 | Wang et al. | 395/603 |
| 5,241,645 | 8/1993 | Cimral et al. | 395/500 |
| 5,257,185 | 10/1993 | Farley et al. | 395/611 |
| 5,299,123 | 3/1994 | Wang et al. | 395/602 |
| 5,369,778 | 11/1994 | San Souci et al. | 395/602 |
| 5,442,771 | 8/1995 | Filepp et al. | 395/200.49 |
| 5,455,945 | 10/1995 | VanderDrift | 395/602 |
| 5,504,921 | 4/1996 | Dev et al. | 395/200.53 |
| 5,519,865 | 5/1996 | Kondo et al. | 395/601 |
| 5,530,852 | 6/1996 | Meske, Jr. et al. | 395/600 |
| 5,630,079 | 5/1997 | McLaughlin | 345/335 |
| 5,630,125 | 5/1997 | Zellweger | 395/614 |
| 5,649,186 | 7/1997 | Ferguson | 707/10 |

OTHER PUBLICATIONS

Proceedings of the Conference on Artificial Intelligence for Applications, Orlando, Mar. 1–5, 1993, No. Conf. 9, 1 Mar. 1993, Institute of Electrical and Electronics Engineers, pp. 345–352, Beerud Sheth et al., "Evolving Agents for Personalized Information Filtering".

Sigir '94 Dublin, Jul. 3–6, 1994, No. Conf. 17, 3 Jul. 1994, Croft W.B.; Van Rijsbergen C.J. (Editors), pp. 272–281, Morita M. et al., "Information Filtering Based on User Behavior Analysis and Best Match Text Retrieval".

IEICE Transactions on Information and Systems, vol. E75-D, No. 2, 1 Mar. 1992, pp. 198–209, Jennings A. et al., "A Personal News Service Based on a User Model Neural Network".

Byte, vol. 21, No. 3, 1 Mar. 1996, pp. 97/98, Baldazo, R., "Navigating with a Web Compass".

*Primary Examiner*—Wayne Amsbury
*Attorney, Agent, or Firm*—Bartron E. Showalter; L. Joy Griebenow

[57] ABSTRACT

A system (10) for automated retrieval of information from one or more information sources (30) includes user parameters (14) that specify an attribute (114, 116, 118, 120) of a user (102). A library (18) contains filters (20) that each specify one or more search parameters for an associated attribute (114, 116, 118, 120). A translator (16) selects one or more filters (20) from the library (18) in accordance with the user parameters (14). A searcher (28) retrieves information from the information sources (30) using the selected filters (20).

20 Claims, 3 Drawing Sheets

SYSTEM AND METHOD FOR AUTOMATED RETRIEVAL OF INFORMATION

TECHNICAL FIELD OF THE INVENTION

This invention relates in general to the field of information management, and more particularly to a system and method for automated retrieval of information.

BACKGROUND OF THE INVENTION

Many people use information as part of their function within a business or other organization. It is often desirable to retrieve selected information from one or more information sources. For example, a person might retrieve selected information from a particular information source using an information request corresponding to an anticipated use of the information. As available information sources become larger and more complex to serve a variety of users, the task to retrieve significant and meaningful information is made more difficult. This flood of information presents a challenge to access information for the user that is appropriate in both context and content.

A known technique for retrieving information allows a person to construct a query using a series of terms and connectors. This technique may not be suitable for people that lack the time or resources often required to selectively access a number of information sources using a number of different protocols. Also, this technique may retrieve information that is inappropriate in both context and content.

SUMMARY OF THE INVENTION

In accordance with the present invention, the disadvantages and problems associated with systems and methods for retrieving information have been substantially reduced or eliminated.

In accordance with one embodiment of the present invention, a system for automated retrieval of information from one or more information sources includes a number of user parameters. The user parameters include an attribute of a user. A library contains a number of filters, one of the filters specifying one or more search parameters for an associated attribute. A translator is coupled to the library and selects one or more filters from the library in accordance with the user parameters. A searcher is coupled to the translator and the information sources. The searcher generates search requests using the search parameters from the selected filters and retrieves information from the information sources using the generated search requests.

Important technical advantages of the present invention include a framework for associating complex, arcane, or technical search terms or protocol with more understandable attributes associated with the user or the user's task. A user attribute corresponds to one or more filters selected from a library of such filters in order to generate search requests for the user. Using the selected filters, the system retrieves information that is relevant to the attribute of the user. Attributes may include a business role that represents a business function of the user, a vocation associated with the user, an industry associated with the user, or a business role of information that specifies a particular purpose for which information retrieved by the system may be used. The present invention further provides an interface for accessing a number of different information sources using one or more communication parameters associated with the information sources in order to retrieve the selected information. The user is therefore able to retrieve selected information from different information sources without constructing complicated search requests each time the user wants information.

Another important technical advantage is that the system may provide filter templates associated with the user that allow the user to generate one or more custom filters. The custom filters may be added to the library if the user finds the custom filters effective for retrieving selected information. The present invention may therefore be customized to assist users in articulating, conveying, and satisfying their particular information needs. Furthermore, the filters may be modified to retrieve information that is more appropriate in both context and content each time information is requested. Other technical advantages are readily apparent to one skilled in the art from the following figures, descriptions, and claims.

BRIEF DESCRIPTION OF THE DRAWINGS

For a more complete understanding of the present invention and for further features and advantages thereof, reference is now made to the following description taken in conjunction with the accompanying drawings, in which.

DETAILED DESCRIPTION OF THE INVENTION

Figure 1:
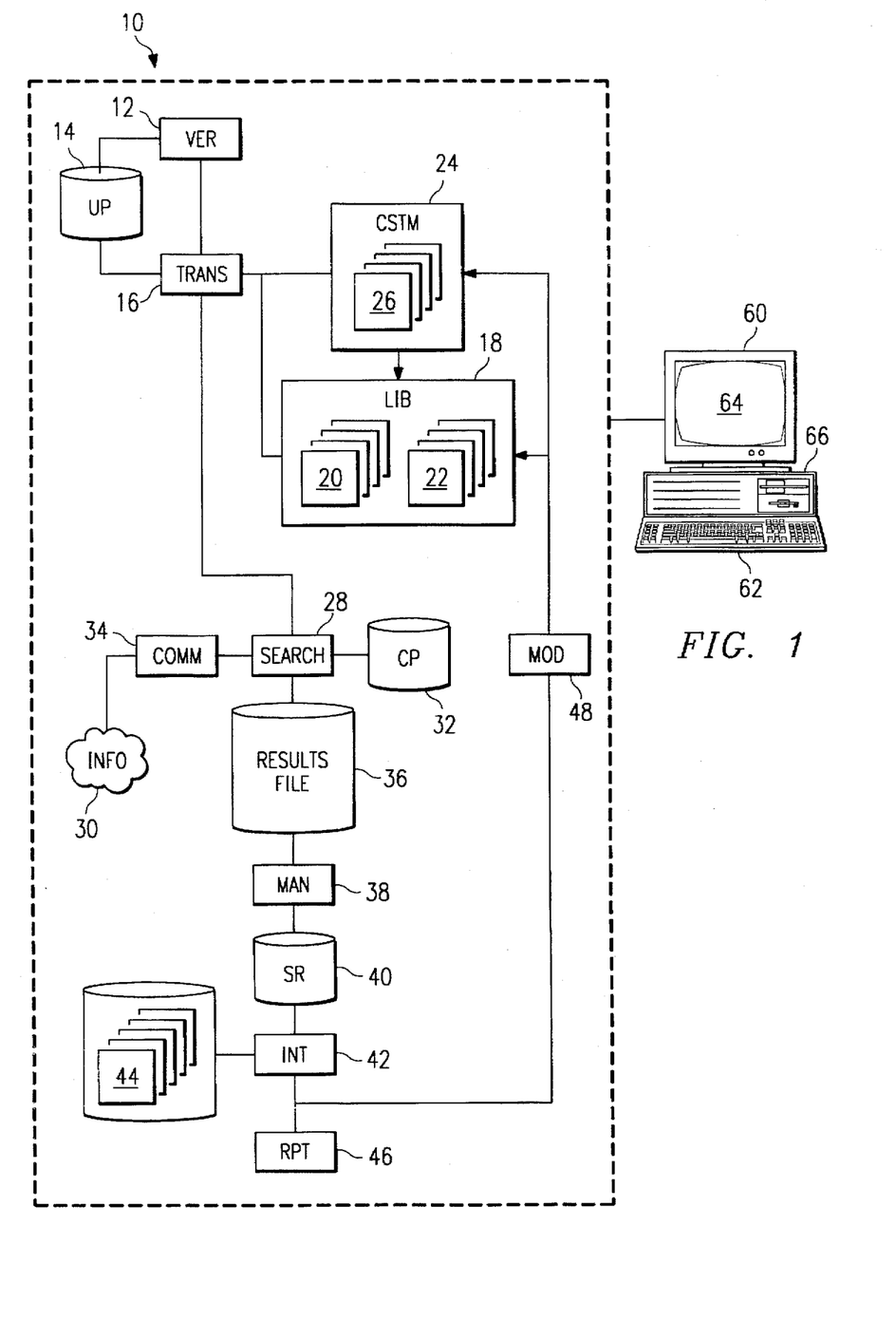
FIG. 1 illustrates a system for retrieving information.

FIG. 1 illustrates a system 10 for automated retrieval of information that includes a verifier (VER) 12 and user parameters (UP) 14. Verifier 12 is coupled to and accesses user parameters 14. In general, verifier 12 receives sign-on information from a user of system 10 and, using the sign-on information and user parameters 14, verifies the identity and authorization of the user. The sign-on information may include, without limitation, a username, a password, and any other information suitable to adequately identify the user. As discussed more fully below, user parameters 14 define user profiles for each authorized user of system 10 for comparison with the sign-on information.

User parameters 14 preferably include, without limitation: (a) an identifier or username; (b) a password; (c) a business role associated with the user that represents a business function of the user; (d) a vocation associated with the user that describes generally an area of expertise or responsibility of the user; (e) an industry associated with the user that describes generally an industry or other business community in which the user functions; (f) a business role of information that describes a particular purpose for which information retrieved by system 10 may be used; and any other characteristic suitable for association with a user or the information needs of the user. Collectively, the business role associated with the user, vocation, industry, and business role of information may be referred to as attributes of the user. User parameters 14 may specify a larger or smaller number of attributes that associate the user or the user's task to be performed with the desired information to be retrieved.

More than one attribute of each of the types described above may be associated with any particular user. For example, a user may have several associated business roles, each business role representing a different business function of the user. Each user may have a unique set of attributes or may share certain attributes with other users. A different set of attributes may be associated with each user for different types of information requests from the user. The present invention contemplates defining and organizing as many attributes as are necessary or desired for retrieving information that satisfies the information needs of authorized users. As discussed more fully below, system 10 generates search requests for each user using one or more filters selected according to the attributes of the user.

User parameters 14 and the corresponding attributes for each user may be specified by a manager, system administrator, or other person before the user first provides sign-on information to system 10, by the user the first time the user provides sign-on information, by the user each time the user provides sign-on information, or in any other suitable manner. For example, system 10 may include a set of standard, pre-defined attributes. Each user community may add specialized attributes to the system, and continue to add and modify attributes to meet the specific needs of the community. Attributes may be selected by the user or others from a menu, listing, index, or other directory of available attributes, where each attribute corresponds to an available filter. Different attributes may be selected for the user each time the user requests information. The present invention contemplates specifying and selecting user parameters 14 and the corresponding attributes for each user in any suitable manner.

Library (LIB) 18 includes a number of filters 20, each filter 20 specifying one or more search parameters associated with a particular attribute, such as a business role, a vocation, an industry, or a business role of information. System 10 uses the search parameters specified for each filter 20 to retrieve information that is relevant to the particular attribute associated with the particular filter 20. Since each user has one or more associated attributes, system 10 selects filters 20 and retrieves information according to the particular information needs of each user that requests information. The manner in which system 10 associates information with and retrieves information for particular users is discussed more fully below.

Library 18 may also include one or more custom filters 22 generated using customizer (CSTM) 24 and filter templates 26. The user may input one or more search parameters using a filter template 26 in order to generate a custom filter 22 to suit the particular information needs of the user. Some or all of the filter templates 26 may initially contain no search parameters, such that the user may entirely define the search performed using the resulting custom filters 22. Alternatively, some or all of the filter templates 26 may initially contain one or more search parameters with which the search parameters input by the user may cooperate. The user need not use or modify custom filters 22 to retrieve information, but may rely solely on specifying attributes and their corresponding filters 20.

In one embodiment, each filter template 26 is associated with a particular attribute and is selected and made available to the user in the manner discussed above in connection with filters 20. System 10 provides the user with a menu, listing, index, or other directory of search parameters that may be relevant to the particular attribute that corresponds to the filter template 26. Any search parameters the user selects are then incorporated into the filter template 26 to generate a custom filter 22 for the attribute. The user may also generate custom filters 22 in this manner for a collection of attributes. The user may modify an existing filter 20 to generate a custom filter 22. Custom filters 22 may be generated according to the particular information needs of the user in any suitable manner.

Once generated, some or all of the custom filters 22 may be stored using library 18. A custom filter 22 may be stored after information has been retrieved using the custom filter 22 or directly in response to generation of the custom filter 22. In one embodiment, a custom filter 22 is not stored using library 18 unless the custom filter 22 has already been used to retrieve information and has successfully retrieved relevant information in a volume that is appropriate for the user. If the retrieved information satisfies the information needs of the user, indicating the desirability of the particular custom filter 22, the user may store the custom filter 22 using library 18 for subsequent use. Custom filters 22 may be stored at any time and in any suitable manner.

Translator (TRANS) 16 is coupled to verifier 12 and library 18. Translator 16 accesses user parameters 14 in order to associate one or more filters 20 and custom filters 22 with each user according to the attributes associated with the user. As discussed above, each filter 20 and custom filter 22 specifies one or more search parameters associated with the attributes of the user, such as a business role of the user, a vocation of the user, an industry of the user, or a business role of information. Due to the association of search parameters with user attributes, system 10 is able to retrieve selected information that is suitable for the particular information needs of each user each time the user requests information.

For example, a filter 20 associated with a particular business role and selected for a user having that business role would contain different search parameters than a filter 20 associated with a different business role. Similarly, a filter 20 associated with a particular vocation, industry, or business role of information and selected for a user having that vocation, industry, or business role of information, respectively, would contain different search parameters than a filter 20 associated with a different vocation, industry, or business role of information, respectively. Translator 16 may also select one or more custom filters 22, whether stored using library 18 or newly created, to replace or combine with a filter 20 corresponding to a particular attribute.

Translator 16 may combine some or all of the filters 20 and custom filters 22 in any manner suitable to satisfy the information needs of the particular user. For example, after translator 16 selects a filter 20 or custom filter 22 for each attribute of the user, system 10 may generate and issue a separate search request for each selected filter 20 or custom filter 22. The information retrieved using the separate search requests might then be consolidated and correlated to eliminate duplicative retrieved information. Alternatively, system 10 may generate and issue one or more comprehensive search requests that each incorporates search parameters for more than one selected filter 20 or custom filter 22. If necessary, the information retrieved using the comprehensive search requests might be consolidated and correlated in a similar manner.

Furthermore, translator 16 may manipulate the search parameters associated with the selected filters 20 so that system 10 may generate several search requests for each information request of the user, each search request varying to some degree from the other search requests for the same information request and the same user. As discussed below, after information has been retrieved using the several search requests, system 10 or the user may select the search request most effective in retrieving the selected information. The selected search request could then be used to satisfy subsequent information requests from the user.

System 10 may generate and issue a series of nested search requests that first retrieve information according to a selected filter 20 that is broad, relative to other selected filters 20, and then successively reduce or narrow the retrieved information according to the other selected filters 20 to generate search results. For example, a relatively broad filter 20 corresponding to a particular business role might be used to retrieve information that could be reduced by successively applying a series of relatively narrow filters 20 to the retrieved information, corresponding to a particular vocation, a particular industry, and a particular business role of information. The present invention contemplates some level of off-line searching capability performed by manipulator 38. Whether search parameters are manipulated or combined before search requests are generated using filters 20 and custom filters 22 or whether the information retrieved using filters 20 and custom filters 22 is manipulated or combined in response to being retrieved, the present invention retrieves selected information according to user parameters 14 associated with each user.

Searcher 28 is coupled to translator 16 and receives the search parameters that correspond to the filters 20 and custom filters 22 selected by translator 16 for the user. Searcher 28 generates and issues one or more search requests according to the search parameters to retrieve selected information from one or more information sources (INFO) 30. Searcher 28 accesses one or more communication parameters (CP) 32 and uses communicator (COMM) 34 to access information sources 30.

For each authorized user and each available and accessible database, library, file, or other information source 30, communication parameters 32 maintain access information that may include, without limitation: a username; a password; a telephone number; communication port settings; database specifications; library and file names; directory paths; library and file paths; protocol information; and any other information suitable for allowing searcher 28 to access information sources 30 in order to retrieve selected information for the user. Communication parameters 32 may include one or more of the user parameters 14, such as the username and the password, and one or more of the search parameters discussed more fully below in connection with FIG. 2b.

Communication parameters 32 allow system 10 to access any number of different information sources 30, each having a different associated protocol or other access parameter, without requiring the user to keep track of and input access information for each information source 30 each time the user requests information. For example, communication parameters 32 may include access information suitable for automatically accessing and retrieving information from: a database maintained internally or externally by the organization; a variety of commercial databases such as CompuServe®, America Online®, Lexis/Nexis®, Westlaw®, Dialog®, Oracle®; one or more Internet browser services or newsgroups; or any other information sources 30. In general, searcher 28 provides communication parameters 32 to communicator 34 in order to access and retrieve information from one or more information sources 30 using communicator 34.

Communicator 34 may be any suitable mechanism for facilitating data communications between searcher 28 and information sources 30. For example, communicator 34 may include the appropriate hardware and software to communicate data using a direct connection to a public switched telephone network, a connection through a local area network (LAN), wide area network (WAN), or other network, or any other suitable communications connection. Communicator 34 may include protocol conversion and some data processing capabilities that enable searcher 28 and information sources 30 to communicate information using communicator 34. The present invention contemplates automatically accessing, communicating information with, and retrieving information from information sources 30 for a particular user in any suitable manner.

Upon accessing information sources 30 using communication parameters 32, searcher 28 issues search requests in accordance with the selected filters 20 and custom filters 22. Once the selected information has been retrieved from information sources 30 in accordance with the search requests issued by searcher 28, the information populates and is stored using results file 36. Results file 36 may store the retrieved information in any form and in any manner suitable to allow the retrieved information to be manipulated and provided to the user in usable form. Manipulator (MAN) 38 is coupled to results file 36 and processes the retrieved information stored using results file 36 to generate search results (SR) 40 that are provided to the user in some suitable manner. Manipulator 38 may combine, reduce, modify, prioritize, index, or manipulate the retrieved information in any suitable manner before, during, or after search results 40 are provided to the user. In a particular embodiment, manipulator 38 may perform additional searches on the retrieved information in accordance with selected filters 20 and custom filters 22.

Interactor (INT) 42 receives search results 40 and elicits responses from the user concerning some or all of the retrieved information. Interactor 42 may elicit user responses concerning the quality, volume, appropriateness, relevance, suitability, or any other characteristic of the retrieved information. In one embodiment, interactor 42 selects and provides to the user one or more feedback prompts 44 according to the information retrieved. The feedback prompts 44 elicit responses from the user concerning the retrieved information. For example, if the volume of information retrieved exceeds or falls below a specified level, interactor 42 might select one or more feedback prompts 44 to elicit responses from the user concerning the volume of information retrieved.

Each feedback prompt 44 may include one or more questions or requests that provide an opportunity for the user to evaluate some or all of the retrieved information in the manner discussed above. For example, a particular feedback prompt 44 might request the user to evaluate the relevance of one or more search parameters, such as a search term or an information source 30 used to retrieve the information, by requesting the user to associate a number with a qualitative description of the relevance of the search parameter according to a numeric scale. Another feedback prompt 44 might request the user to rank one or more search parameters relative to one or more other search parameters. Yet another feedback prompt 44 might request the user to evaluate the volume of information retrieved in some manner, such as by indicating whether the volume was too large or too small and to what degree. The present invention contemplates feedback prompts 44 in any number and in any form suitable for eliciting responses from the user concerning the retrieved information.

Reporter (RPT) 46 receives search results 40 and generates analysis reports concerning the retrieved information. Reporter 46 may generate analysis reports for communication to the user or others and may generate analysis reports before or after interactor 42 elicits responses from the user concerning the retrieved information. Reporter 46 may generate analysis reports in any form and in any manner suitable to communicate search results 40 to the user or others.

Modifier (MOD) 48 is coupled to interactor 42 and may modify some or all of the filters 20, custom filters 22, and filter templates 26 according to the information retrieved or the responses elicited from the user using interactor 42 and feedback prompts 44. System 10, using modifier 48, may modify filters 20 and custom filters 22 by adding, deleting, modifying, or replacing one or more search parameters, such as a specified search term. For example, if the volume of information retrieved using a filter 20 exceeds or falls below a certain level, modifier 48 may modify the collection of search terms for the filter 20 in order to decrease or increase, respectively, the volume of information that system 10 will thereafter retrieve for the same collection of user attributes.

Modifier 48 may not need to modify filters 20 and custom filters 22 unless responses elicited from the user indicate that the user was dissatisfied in some manner with the information retrieved. In one embodiment, the user ranks the relevance of particular search parameters in response to feedback prompts 44. System 10 using modifier 48 receives these rankings and automatically adds, deletes, or otherwise modifies the search parameters or other portions of filters 20 or filters 22. For example, if modifier 48 receives a ranking of a search term below a threshold level according to a numeric scale or below the relevance of one or more other search parameters, modifier 48 might remove the low-ranking search parameter.

Furthermore, as discussed above, system 10 may have generated several search requests for each information request of the user, each search request varying to some degree from the other search requests for the same information request and the same user. For example, a selected filter 20 may contain several search terms, and system 10 may issue several search requests that contain different combinations of the search terms. In response to feedback prompts 44, the user can rank the effectiveness of each search request. Modifier 48 may then modify search terms in filters 20 and custom filters 22 such that the most effective search request is generated for subsequent information requests from the user.

Whether filters 20, custom filters 22, or filter templates 26 are modified according to the information retrieved or responses elicited from the user concerning the retrieved information, system 10 learns to retrieve an information that is relevant to the user each time the user requests information. System 10 may modify one or more filters 20, custom filters 22, or filter templates 26 each time information is retrieved or may learn to such an extent that no modifications are necessary or desirable, depending on the information needs of the user. The learning capability of system 10 provides an important technical advantage.

System 10 may operate on one or more computers 60 that are integral to or separate from the communications hardware and software that support communicator 34. Computer 60 may include an input device 62, such as a keypad, touch screen, microphone, or other device that can accept information. An output device 64 may convey information associated with the operation of system 10, including digital or analog data, visual information, or audio information. Both input device 62 and output device 64 may include fixed or removable storage media, such as magnetic computer disks, CD-ROM, or other suitable media to both receive output from and provide input to system 10. Computer 60 may have a processor 66 and an associated volatile or non-volatile memory to execute instructions and manipulate information in accordance with the operation of system 10.

In operation, verifier 12 receives sign-on information from the user and, using the sign-on information and specified user parameters 14, verifies the identity and authorization of the user. The user may generate one or more custom filters 22 using customizer 24 and filter templates 26. Translator 16 accesses user parameters 14 and selects one or more filters 20 or custom filters 22 according to the attributes associated with each user and specified in user parameters 14. As discussed more fully above, each filter 20 or custom filter 22 specifies one or more search parameters used to generate search requests for each authorized user that requests information.

Searcher 28 receives search parameters corresponding to filters 20 and custom filters 22 and issues one or more search requests in accordance with the search parameters. Searcher 28 uses selected communication parameters 32 and communicator 34 to access information sources 30, issue search requests, and retrieve selected information from information sources 30 in accordance with the search requests. The retrieved information populates and is stored using results file 36 for manipulation and processing by manipulator 38. Manipulator 38 further processes the retrieved information to generate search results 40, which are provided to the user for review.

Interactor 42 receives search results 40 and elicits responses from the user concerning some of all of the retrieved information using one or more feedback prompts 44. Modifier 48 may modify filters 20, custom filters 22, or filter templates 26 in some suitable manner according to the information retrieved or the responses elicited from the user concerning the retrieved information. Reporter 46 generates analysis reports concerning the retrieved information for communicating search results 40 to the user or others.

Figure 2A:
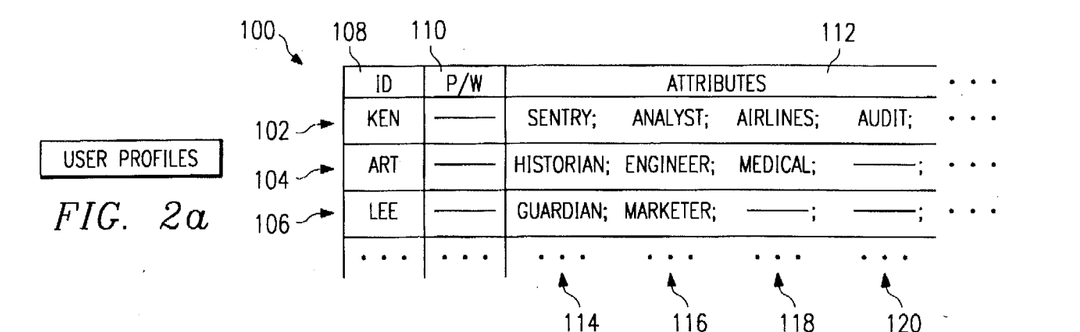
FIG. 2a illustrates a user profile framework.

FIG. 2a illustrates a user profile framework 100 that includes user parameters 14 associated with each authorized user of system 10. As discussed above, user parameters 14 may include, without limitation, an identifier or username (ID) 108, a password (P/W) 110, and one or more user attributes 112 that characterize each user 102, 104, and 106 in some manner. Any discussion concerning user 102 is equally applicable to users 104 and 106. Furthermore, although only users 102, 104, and 106 are discussed, the present invention contemplates more or fewer users, depending upon the circumstances. The present invention further contemplates more than one set of attributes 112 for each user 102. For example, each set of attributes 112 may correspond to a different type of information request or a different information need of user 102.

User attributes may include, without limitation: one or more business roles 114 associated with user 102 that represent a business function of user 102 or a community of users; one or more vocations 116 associated with user 102 that describe generally an area of expertise or responsibility of user 102; one or more industries 118 associated with user 102 that describe generally an industry or other business community in which user 102 functions; one or more business roles of information 120 that describe particular business purposes for which information retrieved by system 10 may be used; and any other characteristic suitable for association with user 102 or the information needs of user 102. System 10 associates a particular filter 20, corresponding to one or more search parameters, with each attribute 112. The present invention contemplates as many attributes 112 as are necessary or desirable to define a suitable user profile for each authorized user 102, 104, and 106. Furthermore, attributes 112 may apply at a group level or an individual level to allow a hierarchy of attributes.

For example, business roles 114 and the business function of a user 102 associated with each business role 114 may include, without limitation: "sentry"—monitoring emerging, evolving, and future trends, changes, signals, opportunities, and threats; "historian"—reviewing and analyzing historical events, patterns, accounts, data, and other information relevant to the business; "guardian"—monitoring, auditing, and tracking records, transactions, events, and precedent related to the business to provide disaster avoidance and risk management; and any other business role 114 that represents a business function of the user 102 and is suitable for associating one or more search parameters with the user 102. By associating a series of search parameters with the business role 114 of user 102, system 10 is able to retrieve information from information sources 30 that is relevant to the business function of user 102 and that user 102 may therefore use in performing the business function.

Vocations 116 that may be associated with user 102 include, without limitation: a financial or other analyst; an engineer; a marketing consultant; a programmer; a medical or other technician; a productivity consultant; or any other description of an area of general or specific expertise or responsibility. Industries 118 that may be associated with user 102 include, without limitation: airlines; medical; lumber; construction; printing; food additives; legal; and any other general or specific description of an industry or other business community in which user 102 functions.

Business roles of information 120 may include, without limitation: auditing financial records; evaluating a medical case history or diagnosing an illness; assessing worker productivity; launching a new product into the marketplace; or any other description of a particular purpose for which the retrieved information may be used. In one embodiment, business roles of information 120 are defined more specifically than business roles associated with the user 114, although both may concern the purpose to which the retrieved information should relate.

User profile framework 100 need not include every conceivable attribute 112 for each user 102, 104, and 106. For example, user 104 may not have a business role of information 120, and user 106 may not have an industry 118 or a business role of information 120. More than one attribute 112 of each of the types described above may be associated with any particular user 102. For example, user 102 may have several associated business roles 114, each business role 114 representing a different business function of user 102. Furthermore, user 102 may have a unique set of attributes 112 or may share certain attributes 112 with users 104 and 106.

The present invention contemplates defining as many attributes 112 as are necessary or desirable under the circumstances and organizing attributes 112 in any suitable manner. As discussed more fully above in connection with FIG. 1, system 10 generates search requests for each user 102, 104, and 106 using one or more filters 20 selected according to the attributes 112 associated with the particular user 102, 104, or 106, respectively.

Figure 2B:
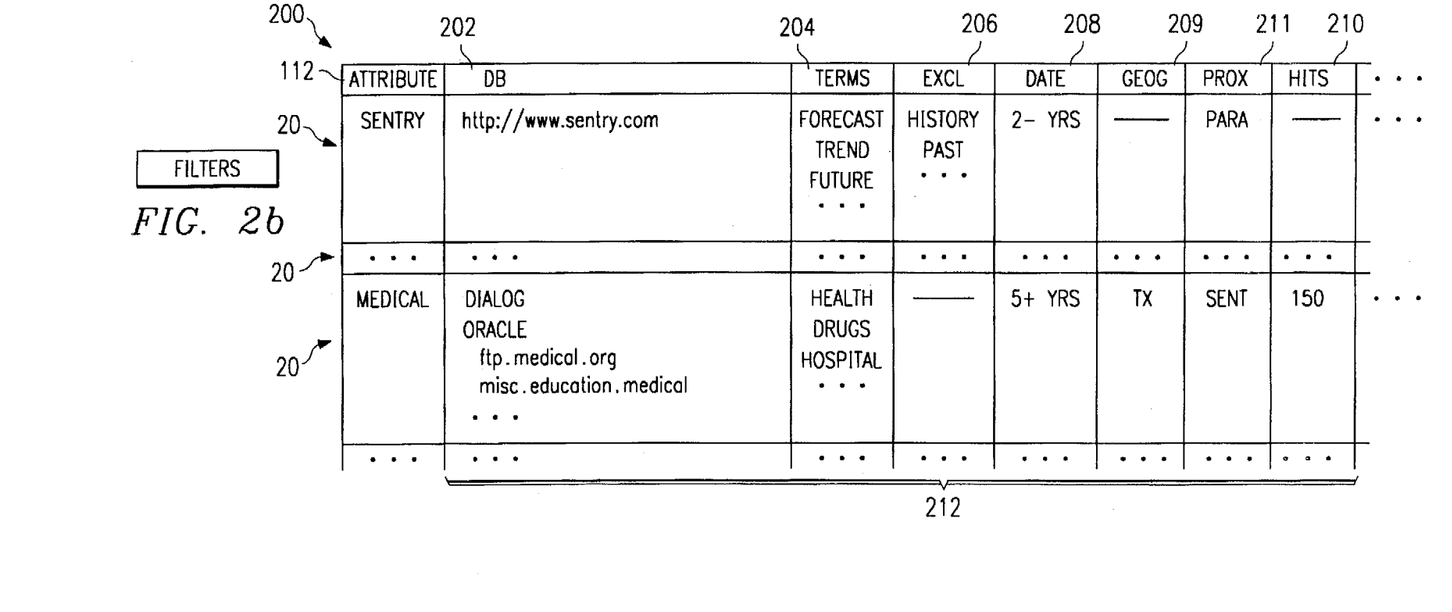
FIG. 2b illustrates a filter framework.

FIG. 2b illustrates a filter framework 200 that includes filters 20 having search parameters 212 associated with each attribute 112. As discussed above, each filter 20 is associated with a particular attribute 112 and specifies search parameters 212 for retrieving information from one or more information sources 30. Search parameters 212 may include, without limitation: (1) a database/file listing (DB) 202 that specifies one or more databases maintained internally or externally by the organization, one or more commercial databases such as Lexis/Nexis®, Westlaw®, Dialog®, or Oracle®, library and file names, Internet sites, newsgroups, library and file paths, and any other suitable identifying and locating information for information sources 30; (2) one or more search terms (TERMS) 204 that may be found in each information record to be retrieved; (3) one or more excluded terms (EXCL) 206 that may not be found in any information record to be retrieved; (4) one or more positive or negative date restrictions (DATE) 208 that specify time periods for which information records created during or otherwise associated with the time periods may be retrieved; (5) one or more geographic restrictions (GEOG) 209 that specify geographic locations for which information records created within or otherwise associated with the geographic location may be retrieved; (6) one or more proximity parameters (PROX) 211 that specify a minimum, maximum, or optimum proximity within an information record for some or all of the search terms 204; (7) a hits parameter (HITS) 210 that specifies a minimum, maximum, or optimum number of information records to retrieve according to some or all of the other search parameters 212; and any other parameter suitable to define a search request.

Each filter 20 need not specify every type of search parameter 212. For example, for the "sentry" business role 114, filter 20 may contain no geographic restriction 209 or hits parameter 210, but may contain a database/file listing 202, a series of search terms 204 and excluded terms 206, a "paragraph" proximity parameter 211, and a maximum two year date restriction 208. Similarly, for the "medical" industry 118, filter 20 may contain no excluded terms 206, but may contain a database/file listing 202, a series of search terms 204, a minimum five year date restriction 208, a "Texas" geographic restriction 209, a "sentence" proximity restriction 211, and a hits parameter 210 of "150." The present invention contemplates as many search parameters 212 as are necessary or desirable to define filters 20 associated with each conceivable attribute 112 of users 102, 104, and 106.

The present invention further contemplates as many search terms 204 and excluded terms 206 as are necessary or desirable for adequately constructing and defining a search request using search parameters 212. For example, filter 20 associated with the "sentry" business role 114 might include search terms 204 such as "forecast," "trend," "future," "emerging," "evolving," "experimental," "embryonic," "change," "signals," "opportunities," "threats," and any other suitable search term 204 or modification of one or more search terms 204. Using filters 20 and search parameters 212, system 10 retrieves selected information from one or more information sources 30 according to the attributes 112 associated with each user 102, 104, and 106.

Figure 3:
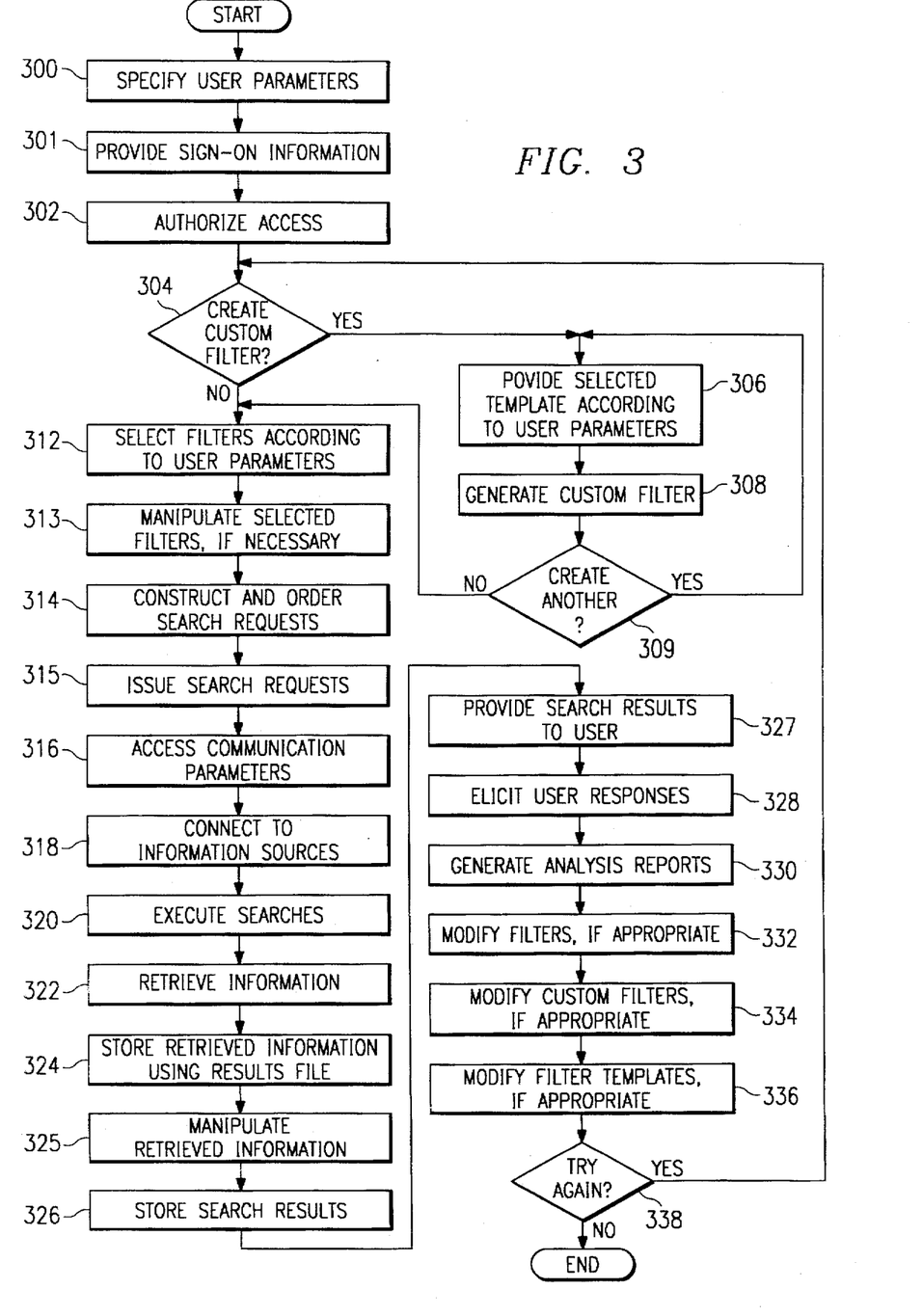
FIG. 3 is a flow chart of a method for retrieving information.

FIG. 3 is a flow chart of a method for retrieving information from one or more information sources 30 using system 10. The method begins at step 300, where user parameters 14 and the corresponding attributes 112 for each user 102, 104, and 106 are specified. As discussed above in connection with FIG. 1, user parameters 14 may be specified by a manager, system administrator, or other person before a user 102 first provides sign-on information to system 10, by user 102 the first time user 102 provides sign-on information, by user 102 each time user 102 provides sign-on information, or in any other suitable manner. Attributes 112 may be selected from a menu, listing, or directory of available attributes 112. Different attributes 112 may be specified for user 102 each time user 102 provides sign-on information or requests selected information. The present invention contemplates specifying user parameters 14 for each authorized user 102, 104, and 106 in any suitable manner.

At step 301, user 102 provides sign-on information that may include a username 108, a password 110, and any other information suitable to adequately identify user 102. At step 302, verifier 12 uses the sign-on information and user parameters 14 to authorize user 102 to access the resources of system 10.

At step 304, user 102 may desire to create one or more custom filters 22 using customizer 24 and filter templates 26. If no custom filter 22 is desired at step 304, the method proceeds directly to step 312, where translator 16 selects one or more filters 20 according to user parameters 14 and the associated attributes 112. If a custom filter 22 is desired at step 304, a filter template 26 may be selected from customizer 24 and provided to the user 102 at step 306. As discussed more fully above in connection with FIG. 1, filter templates 26 may be selected in accordance user parameters 14. At step 308, a custom filter 22 is generated using the filter template 26 and specifies one or more search parameters 212 suitable for generating a search request. If another custom filter 22 is desired at step 309, the method returns to step 304, where a filter template 26 is selected and provided to user 102. Custom filters 22 may be stored using library 18 before or after information is retrieved using custom filters 22.

If another custom filter 22 is not desired at step 309, translator 16 selects one or more filters 20 from library 18 according to user parameters 14 at step 312. As discussed above, user parameters 14 define, for each authorized user 102, 104, and 106, a user profile that includes one or more attributes 112 associated with the particular user 102, 104, or 106. Each filter 20 is associated with a particular attribute 112, such as the "sentry" business role 114 or the "medical" vocation 116, and specifies one or more search parameters 212 associated with the attribute 112.

Once translator 16 has selected one or more filters 20 according to user parameters 14 at step 312, translator 16 may manipulate the search parameters 212 associated with filters 20 and custom filters 22 in some suitable manner at step 313. For example, system 10 may generate and issue a separate search request for each selected filter 20 and custom filter 22. System 10 may generate and issue one or more comprehensive search requests that each incorporates search parameters for more than one selected filter 20 or custom filter 22. If necessary, the information retrieved using the separate or comprehensive search requests may be consolidated and correlated in some manner to eliminate duplicative retrieved information.

After searcher 28 receives search parameters 212 from translator 16, searcher 28 constructs and orders one or more search requests using search parameters 212 at step 314. Searcher 28 issues the search requests in accordance with the selected filters 20 and the corresponding search parameters 212 at step 315. System 10 may generate several search requests for each information request of the user, each search request varying to some degree from the other search requests for the same information request and the same user. For example, a selected filter 20 may contain several search terms, and system 10 may issue several search requests that contain different combinations of the search terms. Alternatively, system 10 may generate and issue a series of nested search requests that first retrieve information according to a selected filter 20 that is broad, relative to other selected filters 20, and then successively reduce or narrow the retrieved information according to the other selected filters 20 to generate search results 40. Searcher 28 may generate and issue one or more search requests using search parameters 212 in any suitable manner.

At step 316, searcher 28 accesses communication parameters 32 to access one or more information sources 30 using communicator 34. Communication parameters 32 maintain access information for each authorized user 102, 104, and 106 and for each information source 30 that is available and accessible to a user 102, 104, or 106. Communication parameters 32 allow system 10 to automatically access and retrieve information from information sources 30 for each user 102, 104, and 106 without requiring the user 102, 104, or 106 to keep track of and input access information for each information source 30 each time the user 102, 104, or 106 wants to retrieve information.

At step 318, searcher 28 connects to the appropriate information sources 30 using communication parameters 32 and communicator 34. At step 320, searcher 28 executes one or more searches according to the search requests. As discussed above, where searcher 28 has issued more than one search request at step 315, searcher 28 may execute a separate search at step 320 for each search request or may execute one or more searches at step 320, each associated with more than one search request or a combination of search parameters 212.

At step 322, searcher 28 retrieves selected information from information sources 30 in accordance with the search requests. The information retrieved as a result of the searches is stored at step 324 using results file 36. At step 325, manipulator 38 manipulates the retrieved information to produce search results 40. Search results 40 are stored at step 326 and provided to user 102 at step 327. Manipulator 38 may combine, reduce, modify, prioritize, index, further search, or manipulate the retrieved information in any suitable manner before, during, or after search results 40 are provided to user 102 at step 327. Search results 40 may be provided to user 102 at step 327 in any suitable form and in any suitable manner, for example, in an indexed list or other suitable arrangement.

At step 328, interactor 42 elicits one or more responses from user 102 concerning some or all of the retrieved information. Interactor 42 accesses feedback prompts 44 and provides one or more feedback prompts 44 to user 102 to elicit responses concerning the quality, volume, appropriateness, relevance, suitability, or any other characteristic of the retrieved information. In one embodiment, interactor 42 selects and provides feedback prompts 44 to user 102 according to the information retrieved. For example, if the volume of information retrieved exceeds or falls below a specified level, interactor 42 might select one or more feedback prompts 44 to elicit responses from the user concerning the volume of information retrieved. Further feedback prompts 44 might request user 102 to compare several search results 40, each generated using a different combination of search parameters 212, in order to indicate the relative desirability of the various combinations of search parameters 212. The present invention contemplates feedback prompts 44 in any number and in any form suitable for eliciting responses from the user concerning the retrieved information at step 328.

Reporter 46 generates analysis reports concerning the retrieved information at step 330. Reporter 46 may generate analysis reports for communication to user 102 or others and may generate analysis reports before or after interactor 42 elicits responses from user 102 concerning the retrieved information. Reporter 46 may generate analysis reports in any form and in any manner suitable to communicate search results 40 to the user or others, including another device or system.

Depending on the content of the retrieved information or the user responses, it may be desirable to modify filters 20, custom filters 22, or filter templates 26 in some suitable manner at steps 332, 334, and 336, respectively. These modification steps may be performed periodically or each time system 10 retrieves information. System 10, using modifier 48, modifies filters 20 and custom filters 22 by adding, deleting, modifying, or replacing one or more search parameters 212, such as a specified search term 204. For example, if the volume of information retrieved using a filter 20 exceeds or falls below a certain level, modifier 48 may modify the collection of search terms 204 for the filter 20 in order to decrease or increase, respectively, the volume of information that system 10 will thereafter retrieve for the same collection of user attributes 112.

System 10 may have generated several search requests for each information request of the user, each search request varying to some degree from the other search requests for the same information request and the same user. For example, system 10 may have issued several search requests that contain different combinations of the search terms specified by the selected filters 20. After selected information has been retrieved using the several search requests, system 10 or the user may select the search requests most effective in retrieving the selected information. Modifier 48 may then modify filters 20 and custom filters 22 such that the most effective search request is generated for subsequent information requests from the user. The present invention contemplates modifying filters 20, custom filters 22, and filter templates 26 in any relative order and in response to any suitable event.

After all modifications, if any, have been made at steps 332, 334, and 336, interactor 42 may request that user 102 try again to retrieve information at step 338. In one embodiment, user 102 is requested to try again after modifier 48 has suitably modified one or more filters 20, custom filters 22, and filter templates 26 in accordance with the information retrieved or the responses elicited from user 102 using interactor 42. Because system 10 has the ability to learn as a result of such modifications, information subsequently retrieved for the same collection of attributes 112 may be more relevant or otherwise suitable for the information needs of user 102.

If user 102 desires to try again to retrieve information at step 338, the method returns to step 304, where a custom filter 22 may be created using a modified filter template 26 and customizer 24. If one or more filter templates 26 were not modified at step 336, the method returns instead to step 312, where translator 16 selects filters 20 and custom filters 22, one or more of which may have been modified at steps 332 and 334, respectively, in accordance with user parameters 14. If user 102 does not desire to try again at step 338 to retrieve selected information using system 10, the method ends.

Although the present invention has been described with several embodiments, a plethora of changes, substitutions, variations, alterations, transformations and modifications may be suggested to one skilled in the art, and it is intended that the present invention encompass such changes, substitutions, variations, alterations, transformations and modifications as fall within the spirit and scope of the appended claims.

What is claimed is:

1. A system for automated retrieval of information from one or more information sources, comprising:

at least one attribute that:

comprises a business role of information describing a particular purpose for which information may be used;

is associated with a work activity corresponding to a particular usage of information; and indicates selected information for which retrieval is likely to be desirable for the usage;

a library containing a plurality of information filters, each information filter specifying one or more search parameters corresponding to the attribute;

a translator coupled to the library and operable to select one or more information filters from the library in accordance with the attribute; and a searcher coupled to the translator and the information sources, the searcher operable to generate one or more search requests according to the search parameters specified by the selected information filters, the searcher further operable to retrieve information from the information sources using the generated search requests.

2. The system of claim 1, wherein the attribute is a user attribute associated with a particular user of the system.

3. The system of claim 1, wherein the attribute is a user attribute that comprises an industry associated with a particular user of the system.

4. The system of claim 1, wherein each of the information filters is associated with a particular one of a plurality of attributes, each attribute:

comprising a business role of information describing a particular purpose for which information may be used;

associated with a work activity corresponding to a particular usage of information; and indicating selected information for which retrieval is likely to be desirable for the usage.

5. The system of claim 1, wherein each of the information filters comprises:

a database/file listing; and one or more search terms.

6. The system of claim 1, further comprising a modifier operable to automatically modify the search parameters specified by an information filter in response to the information being retrieved.

7. The system of claim 1, further comprising an interactor operable to elicit responses from a user in response to the information being retrieved using one or more feedback prompts.

8. The system of claim 1, further comprising communication parameters associated with each information source, the searcher accessing the communication parameters to retrieve information from the information sources.

9. A method for automated retrieval of information from one or more information sources, comprising:

retrieving a user profile defined by one or more user parameters, the user parameters comprising at least one attribute that:

comprises a business role of information describing a particular purpose for which information may be used;

is associated with a work activity corresponding to a particular usage of information; and indicates selected information for which retrieval is likely to be desirable for the usage;

associating the user parameters with one or more information filters selected from a plurality of stored information filters, each information filter specifying one or more search parameters corresponding to an associated attribute;

generating one or more search requests according to the search parameters specified by the selected information filters;

issuing the search requests to the information sources; and retrieving information from the information sources in accordance with the search requests.

10. The method of claim 9, wherein the attribute is a user attribute associated with a particular user of the system.

11. The method of claim 9, wherein the attribute is a user attribute that comprises an industry associated with a particular user of the system.

12. The method of claim 9, wherein each of the information filters is associated with a particular one of a plurality of attributes, each attribute:

comprising a business role of information describing a particular purpose for which information may be used:

associated with a work activity corresponding to a particular usage of information: and indicating selected information for which retrieval is likely to be desirable for the usage.

13. The method of claim 9, further comprising the step of accessing communication parameters associated with each information source, the searcher accessing the communication parameters to retrieve information from the information sources.

14. The method of claim 9, wherein each information filter comprises:

a database/file listing; and one or more search terms.

15. A method for automated retrieval of information from one or more information sources, comprising:

retrieving a user profile defined by one or more user parameters, the user parameters comprising at least one attribute that:

comprises a business role of information describing a particular purpose for which information may be used:

is associated with a work activity corresponding to a particular usage of information: and indicates selected information for which retrieval is likely to be desirable for the usage;

associating the user parameters with one or more information filters selected from a plurality of stored information filters, at least one information filter specifying one or more search parameters corresponding to the attribute;

generating one or more search requests according to the search parameters specified by the selected filters;

issuing the search requests to the information sources;

retrieving information from the information sources in accordance with the search requests;

eliciting responses from the user concerning the retrieved information; and modifying the selected information filters in accordance with the responses.

16. The method of claim 15, wherein eliciting responses includes requesting the user to assess the relevance of the specified search parameters.

17. The method of claim 15, wherein eliciting responses includes requesting the user to evaluate the volume of information retrieved.

18. The method of claim 15, wherein the attribute is a user attribute associated with a particular user of the system.

19. The method of claim 15, wherein each of the information filters is associated with a particular one of a plurality of attributes, each attribute:

comprising a business role of information describing a particular purpose for which information may be used;

associated with a work activity corresponding to a particular usage of information: and indicating selected information for which retrieval is likely to be desirable for the usage.

20. The method of claim 15, wherein the responses are elicited using one or more feedback prompts.

* * * * *